Feb. 6, 1951
C. R. ZOOK
2,540,926
CONVERSION UNIT FOR MOTORCYCLES
Filed June 11, 1948
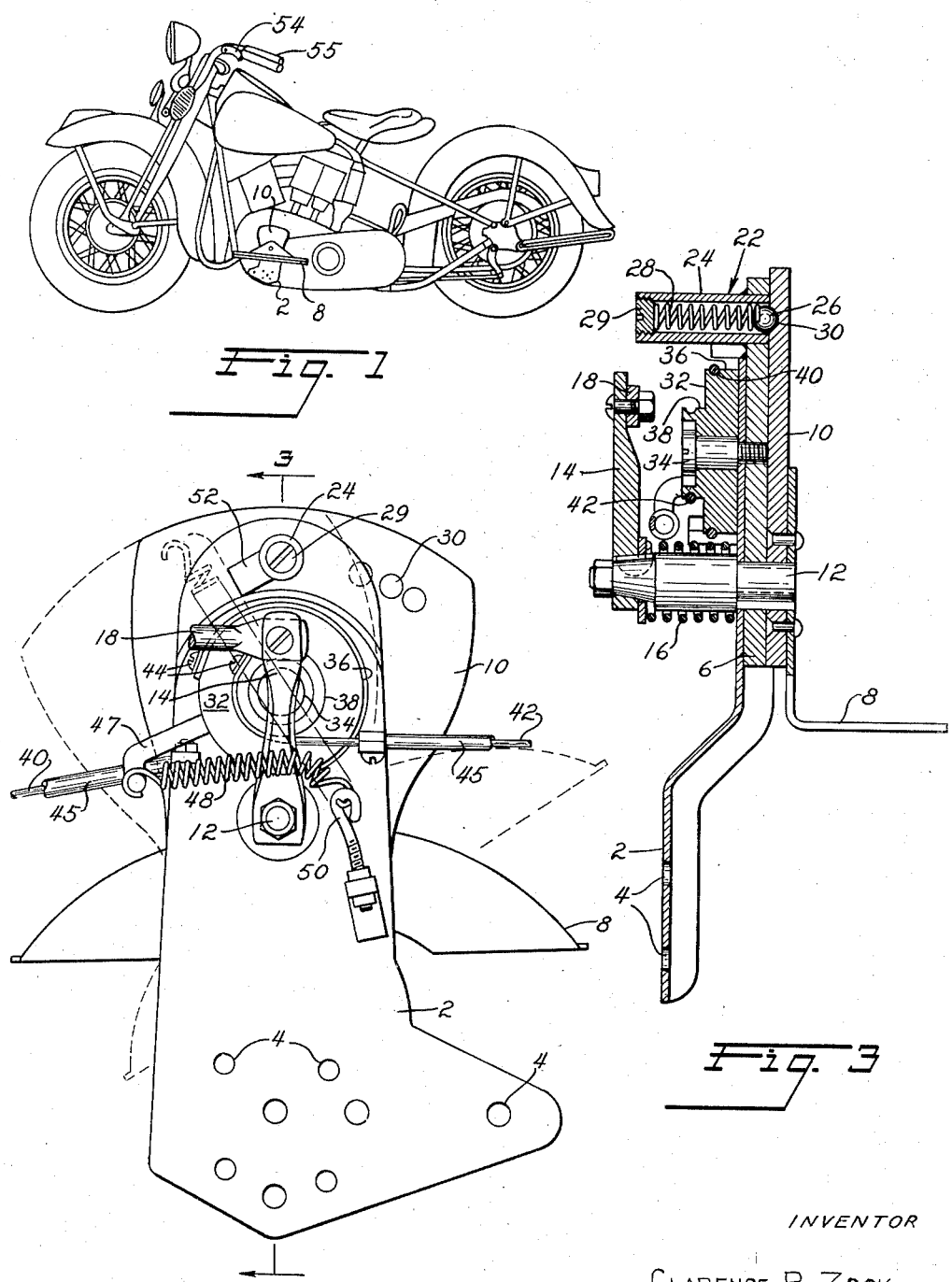
INVENTOR
CLARENCE R. ZOOK
James H. Littlepage
ATTORNEY Patented Feb. 6, 1951

2,540,926

UNITED STATES PATENT OFFICE 2,540,926

CONVERSION UNIT FOR MOTORCYCLES

Clarence R. Zook, Bringhurst, Ind.

Application June 11, 1948, Serial No. 32,499

3 Claims. (Cl. 74—474)

This invention relates to an attachment for motorcycles and the like vehicles and more particularly, to a control unit for motorcycle transmissions.

In certain of the motorcycles which currently are typical, the change-speed gears are shifted, step by step, by a hand lever disposed at one side of the frame, and during the shifting operations, the use of one hand must be delegated to this lever. The conventional clutch is controlled by an auxiliary pedal, the use of which requires the displacement of the rider's foot from a foot-rest pedal to the auxiliary pedal. The operating abnormalaties resulting from displacement of the rider's hand and foot are cumulative because, however temporary, they occur simultaneously.

The object of this invention is to provide a conversion unit for controlling the transmission of a motorcycle so that, in shifting gears, the rider can maintain his hands and feet in positions closely approaching those maintained during normal operation.

More specifically, it is intended to provide a transmission control conversion unit applicable to conventional motorcycles with no serious alteration of the vehicle, and adaptable to any one of a number of makes of motorcycles with but minor modification of the unit.

Accordingly, it is now proposed to provide a conversion unit including a pedal simulating, in form and effect, a foot-rest pedal, but pivoted so as to be rockable between a number of gear-shifting positions. This pedal, together with an arm which swings therewith, is intended to replace the usual hand gear-shift lever, the arm being connectable via a suitable rod to the motorcycle gear box. Among other and equally important objects, is the formation and mounting of the pivoted pedal so that it can take the full, straight-on thrust from the rider's foot without rocking unless the rider deliberately rocks his foot. In the furtherance of this latter objective, it is herein proposed to provide a snap-action detent for releasably holding the pedal in selected position so as to provide a snap-controlled, step-by-step gear-shift motion. As replacement for the customary pedal control for a motorcycle clutch, an object now is to provide, in the conversion unit, a rotatable barrel having two different-size diameters, each being the wrap-around terminus of a flexible cable. The cable from the smaller diameter is adapted to extend to a handgrip lever on the motorcycle handlebar while the other cable runs to the clutch so that, upon squeezing of the hand-grip lever, the clutch is released.

Finally, it is intended to provide a mounting bracket for the conversion unit including a side plate, behind which the essential moving parts, except for the pedal, are shielded from view, against entanglement with the rider's trousers, and against damage when the motorcycle is upset. These and other objects will be apparent from the following specification and drawings, in which:

Fig. 1 is a side elevation of a motorcycle with the conversion unit attached;

Fig. 2 is a side elevation of the conversion unit as seen from the inner side, and;

Fig. 3 is a vertical cross section taken along the line 3—3 of Fig. 2.

Referring now to the drawing in which like reference numerals denote the same or similar elements, the conversion unit comprises a bracket 2 adapted to be secured by conventional bolts affixed through openings 4 to the chassis of a motorcycle. In mounting the bracket, the cap screws originally holding the clutch pedal bracket are taken out when the clutch pedal bracket is removed. The lower end of the spill bar is connected, and the foot board removed. The bracket is then placed on the side of the motorcycle, with the cap screws, and bolts holding the spill bar and foot board replaced through openings 4. Bracket 2 further comprises a side plate 6 on which a pedal 8 is rotatably mounted. It should be noted that pedal 8 is rightly suspended from a face plate 10 in which, in turn, is affixed on shaft 12 extended through face plate 10 and having affixed on its inner end an arm 14. Compression spring 16 is engaged between arm 14 and side plate 6 for holding face plate 10 in tight sliding engagement against side plate 6.

The upper end of arm 14 is connected by rod 18 to the shifting member of gear box on the motorcycle so that when pedal 8 is rocked backwardly or forwardly the shifting member is correspondingly moved to shift the gears. The shifting member and gear box are not detailed, these being well known in the art.

Pedal 8 is yieldably held in selected position by a detent, indicated generally at 22 and comprising a tubular socket 24 affixed on the inside of side plate 6, and a ball 26 pressed towards face plate 10 by compression spring 28, the inner end of which abuts screw plug 29 in socket 24. An arcuate series of semi-circular recesses 30 is provided on the inner side of face plate 10, the recesses being spaced from one another to correspond with different gear shifting positions of pedal 8.

It will thus be seen that spring 16 and detent 22 hold pedal 8 quite firmly in selected position, enough so, in fact, that the rider can center his full weight on pedal 8 without rocking it. However, at the rider's election, he may snap his foot forwardly or rearwardly and thus rock the pedal to the next change-speed position. In this operation, of course, arm 14 moves rod 18 so as to operate the shifting member.

The motorcycle clutch control comprises a barrel indicated generally at 32 rotatably mounted on the inner side of side plate 6 by spindle bolt 34, the barrel having large and small cylindrical surfaces 36 and 38 around which the terminal ends of cables 40 and 42 are wrapped and secured by anchor screws 44, the cables sliding in the usual flexible cable guards 45 anchored to the base plate at 46.

Counter-balancing torque is applied to barrel 32 through a lever 47 connected to one end of a tension spring 48, the other end of the spring anchored at 50 to side plate 6, so that it is easier for the operator to overcome the relatively strong spring conventionally used in motorcycles, by compressing hand lever 54. Rotation of barrel 32 is limited by engagement of lever 46 with a stop 52, which also keeps the cables snug on the barrels.

Cable 42 connects with a hand grip lever 54 on motorcycle handle bar 55 so that when the hand grip lever is squeezed, barrel 32 is rotated. The large diameter surface 38 of the barrel is connected by cable 40 to the conventional motorcycle clutch release lever and the clutch will thus be disengaged by compression of hand grip lever 54. A mechanical advantage in the operation of the clutch is obtained through the different diametrical sizes of surfaces 36 and 38 of barrel 32. The clutch spring, of course, returns barrel 32 to normal position and the barrel, in turn, returns hand grip lever 54 to open by the pull exerted through cable 42.

In operation of the unit, the rider rests his foot on pedal 8 and, when he desires to shift gears, squeezes hand grip lever 54, and off he goes.

I claim:

1. A conversion unit for the transmission controls of motorcycles and the like vehicles, comprising a side plate adapted to be secured to the chassis of a motorcycle to overlap the lower portion of one side thereof, a shaft rotatably mounted in said side plate and having inner and outer ends respectively extending from the inner and outer sides of said side plate, a face plate affixed to said outer end and slidably engaging the outer side of said side plate, a pedal on said face plate, a lever on the inner end of said shaft adapted for connection with a push rod for the transmission control, a compression spring around said shaft engaged between the inner end of said shaft and said side plate for holding said face plate in tight sliding engagement against said side plate, said face plate being substantially broader than said side plate and extending thereabove whereby to mask said side plate, and yieldable detent means comprising a spring pressed latch on one of said plates, the other of said plates having a series of recesses spaced along an arc for respectively receiving said latch.

2. A conversion unit for the transmission controls of motorcycles and the like vehicles, comprising a side plate adapted to be secured to the chassis of a motorcycle to overlap the lower portion of one side thereof, a shaft rotatably mounted in said side plate and having inner and outer ends respectively extending from the inner and outer sides of said side plate, a face plate affixed to said outer end and slidably engaging the outer side of said side plate, a pedal on said face plate, a lever on the inner end of said shaft adapted for connection with a push rod for the transmission control, a compression spring around said shaft engaged between the inner end of said shaft and said side plate for holding said face plate in tight sliding engagement against said side plate, said face plate being substantially broader than said side plate and extending thereabove whereby to mask said side plate, and yieldable detent means comprising a spring pressed latch on one of said plates, the other of said plates having a series of recesses spaced along an arc for respectively receiving said latch, a socket on said side plate having an open end disposed towards said face plate, and a ball and spring arranged in said socket for pressing said ball towards said face plate, said face plate having an arcuate series of recesses disposed towards said side plate and arranged to receive said ball, whereby to define a series of angular positions for said face plate.

3. A conversion unit for the transmission controls of motorcycles and the like vehicles, comprising a side plate adapted to be secured to the chassis of a motorcycle to overlap the lower portion of one side thereof, a shaft rotatably mounted in said side plate and having inner and outer ends respectively extending from the inner and outer sides of said side plate, a face plate affixed to said outer end and slidably engaging the outer side of said side plate, a pedal on said face plate, a lever on the inner end of said shaft adapted for connection with a push rod for the transmission control, a compression spring around said shaft engaged between the inner end of said shaft and said side plate for holding said face plate in tight sliding engagement against said side plate, said face plate being substantially broader than said side plate and extending thereabove whereby to mask said side plate, and yieldable detent means comprising a spring pressed latch on one of said plates, the other of said plates having a series of recesses spaced along an arc for respectively receiving said latch, a barrel rotatably mounted on the inner side of said side plate, said barrel having two cylindrical surfaces therein of respectively different diameters, and a cable wrapped on one of said surfaces and connected to a hand lever on the motorcycle handlebar whereby, upon operation of said hand lever said barrel is rotated, and a second cable wrapped on the other of said surfaces and adapted for connection to an operating member of the motorcycle clutch whereby, upon rotation of said barrel, said clutch is disengaged.

CLARENCE R. ZOOK.

REFERENCES CITED

The following references are of record in the file of this patent:

UNITED STATES PATENTS

| Number | Name | Date |
|---|---|---|
| 1,136,411 | Davis | Apr. 20, 1915 |
| 1,225,721 | Nash | May 8, 1917 |
| 1,472,358 | Edwards | Oct. 30, 1923 |
| 1,641,176 | Lewis | Sept. 6, 1927 |
| 1,671,479 | McIntyre | May 29, 1928 |

FOREIGN PATENTS

| Number | Country | Date |
|---|---|---|
| 326,387 | Great Britain | Mar. 13, 1930 |
| 424,154 | Great Britain | Feb. 15, 1935 |
| 460,989 | Great Britain | May 2, 1935 |
| 531,369 | Great Britain | Jan. 2, 1941 |